United States Patent
Kobayashi et al.

(10) Patent No.: US 6,229,688 B1
(45) Date of Patent: May 8, 2001

(54) CHIP TYPE SOLID ELECTROLYTIC CAPACITOR

(75) Inventors: Atsushi Kobayashi; Akiyoshi Tainaka; Hideaki Sato, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/639,327

(22) Filed: Aug. 16, 2000

(30) Foreign Application Priority Data

Aug. 18, 1999 (JP) .................................................. 11-231566

(51) Int. Cl.⁷ ...................................................... H01G 9/00
(52) U.S. Cl. ......................... 361/523; 361/523; 361/334; 361/540; 205/173; 205/317
(58) Field of Search ....................... 361/523, 534, 361/540, 528–529, 334; 29/25.03; 205/173, 317

(56) References Cited

U.S. PATENT DOCUMENTS 5,951,840 * 9/1999 Fukaumi et al. ...................... 205/173

FOREIGN PATENT DOCUMENTS 4-280660 10/1992 (JP) .

* cited by examiner

*Primary Examiner*—Dean A. Reichard
*Assistant Examiner*—Nguyen Ha

(57) ABSTRACT

A water vapor discharge passage 10 formed of fine porous fluorocarbon resin having high water vapor permeability is provided in a chip type solid electrolytic capacitor having a capacitor element 1 and an anode terminal 2 and a cathode terminal 3 for external electric connection and encapsulated in a mold resin 4. The water vapor discharge passage communicates an interior of the capacitor element with atmosphere.

12 Claims, 3 Drawing Sheets

CHIP TYPE SOLID ELECTROLYTIC CAPACITOR

BACKGROUND OF THE INVENTION

1. Field of the Invention

The present invention relates to a chip type solid electrolytic capacitor and, particularly, to a chip type solid electrolytic capacitor constructed with a solid electrolytic capacitor element encapsulated in a mold resin.

2. Description of the Prior Art

A conventional chip type tantalum solid electrolytic capacitor encapsulated in a mold resin will be described with reference to a cross section thereof shown in FIG. 1. In FIG. 1, an end of an external anode terminal 2 for external electric connection is directly connected to an end of an anode lead 5 of a capacitor element 1 and an end portion of an external cathode terminal 3 is connected to a cathode terminal of the capacitor element 1 through an electrically conductive adhesive 6. The capacitor element 1, the anode lead 5 together with the end portion of the external anode terminal 2 and the end portion of the external cathode terminal 3 together with the electrically conductive adhesive 6 are encapsulated in a mold resin 4 of such as epoxy resin such that the remaining portions of the anode terminal 2 and the cathode terminal 3 are led out from the capacitor element 1 through the mold resin 4. The anode terminal 2 and the cathode terminal 3 are bent such that the these terminals 2 and 3 extend along side surfaces of the mold resin and a mounting surface, that is, a lower surface of the mold resin 4.

Describing a fabrication method of the tantalum solid electrolytic capacitor element 1, a porous anode member having a number of minute voids is obtained by sintering metal tantalum powder into, for example, a parallelepiped shape and, then, a tantalum oxide film (not shown) is formed on a surface of the parallelepiped porous anode member as a dielectric member by anodizing the surface of the parallelepiped porous anode member. Incidentally, in order to form the anode lead 5, a tantalum wire is preliminarily implanted in one of surfaces of the parallelepiped porous anode member before the sintering is performed. The anodizing of the surfaces of the porous anode member is performed such that no tantalum oxide film is formed on a surface of the anode lead 5.

Thereafter, a manganese dioxide film (not shown) is formed on the tantalum oxide film as a solid electrolytic layer and a cathode conductor layer is formed on the solid electrolytic layer. The solid electrolytic layer may be formed of electrically conductive high molecular material such as pyrrole or thiophene. The cathode conductor layer is formed by laminating, for example, a graphite layer and a silver paste layer, in the order.

Thereafter, the end portion of the anode terminal 2 in the form of a flat plate is electrically and mechanically connected to the end portion of the anode lead 5 of the tantalum solid electrolytic element 1 by electric resistance welding or laser welding. Furthermore, the end portion of the cathode terminal 3 in the form of a flat plate, which is preliminarily shaped correspondingly to a surface configuration of the solid electrolytic capacitor element 1, is electrically and mechanically connected to the cathode conductor layer on a surface of the solid electrolytic capacitor element 1 by the electrically conductive adhesive 6.

Thereafter, the solid electrolytic capacitor element 1 with the anode lead 5, the portions of the anode terminal 2 and the cathode terminal 3 are encapsulated in the mold resin 4 of thermosetting resin such as epoxy resin by using a transfer molding process.

Finally, portions of the anode terminal 2 and the cathode terminal 3, which are led out from the mold resin 4, are bent along the side surfaces and then the lower surface of the resin mold 4, resulting in the resin-capsulated chip type tantalum solid electrolytic capacitor shown in FIG. 1.

In order to realize an electronic circuit designed with using various electronic parts including active parts such as semiconductor devices and passive parts such as capacitors, these parts are mounted on a mounting substrate such as a printed circuit board. The mounting of such parts itself is usually performed by using a solder reflow method. In such case, a surface mounting part having a terminal structure as shown in FIG. 1 is mounted on the printed circuit board by soldering connecting portions 71 and 72 of the anode and cathode terminals 2 and 3, which extend along the lower surface (mounting surface) of the mold resin 4, to lands of the printed circuit board.

In the conventional chip type solid electrolytic capacitor, there may be a case where a connection between the chip type solid electrolytic capacitor and the mounting substrate is broken by deviation of the chip type capacitor from a precisely positioned initial location on the land portions of the mounting substrate or by a phenomenon called "tombstone" in which the chip type capacitor uprises vertically, in a progress of the solder reflow process. The positional deviation and the tombstone phenomenon of the chip type capacitor in the progress of the solder reflow process may occur for the reasons to be described below.

Briefly describing the mounting of, for example, the chip type solid electrolytic capacitor by using solder reflow, the land portions of the mounting substrate are painted with cream solder and then the chip type capacitor is positioned on the mounting substrate such that the connection portions 71 and 72 of the chip type capacitor are exactly located on the land portions, respectively. In this state, the chip type capacitor is temporarily fixed to the mounting substrate by the cream solder. Thereafter, the mounting substrate together with the chip type capacitor thereon is heated to a temperature not lower than a melting point of the cream solder to melt the cream solder. Finally, the heating is terminated to lower the temperature to thereby solidify the solder again.

The heating may be performed by heat source contact method for directly heating a lower surface of the mounting substrate or environment heating method for heating the mounting substrate and the parts mounted thereon by means of a hot blast furnace or an infrared furnace. The heating temperature is theoretically any so long as it is not lower than the melting point of the solder. However, taking adverse effect on electronic parts and production efficiency thereof when they are exposed to a temperature substantially higher than a practical temperature or guaranteed temperature such as the melting point of the solder for a long time into consideration, it is usual to use a temperature profile including high speed heating to a high peak temperature and a short holding time of the peak temperature. That is, it is usual to rapidly heating the mounting substrate and the chip type capacitor to, for example, 240° C. and keep the temperature for a time not longer than, for example, 10 seconds.

In the chip type tantalum solid electrolytic capacitor shown in FIG. 1, the capacitor element 1, particularly, manganese dioxide forming the solid electrolytic layer or electrically conductive high molecular layer, a graphite layer and the silver paste layer constituting the cathode conductive layer thereof, contains water, which is taken therein from vaporized water in atmosphere during the fabrication process of the capacitor element or during a storage of the fabricated capacitor element.

Water content contained in the capacitor element of the chip type capacitor is heated to a temperature higher than the boiling point thereof in mounting the chip type capacitor on the mounting substrate by solder reflow and vaporized to increase the internal pressure of the mold resin 4. Since the chip type capacitor is rapidly heated to the solder reflow temperature as high as 240° C. substantially higher than the boiling point of water, the internal pressure of the chip type capacitor is increased substantially at high rate. In such case, since the capacitor element 1 of the conventional chip type solid electrolytic capacitor shown in FIG. 1 is completely encapsulated by the humidity resistant mold resin 4 of such as epoxy resin, vapor thus generated in the chip type capacitor can not escape through the mold resin, so that all high pressure due to water vapor is exerted on the mold resin 4. As a result, portions of the mold resin 4, which may be relatively thin portions corresponding to the connecting portions 71 and 72 on the lower surface side of the chip type capacitor, are cracked and water vapor in the mold resin blows off through the cracks.

When such abrupt blow-off of water vapor from the chip type capacitor occurs in the temporary fixing step or in the melting step of the solder in the progress of the solder reflow, which includes the temporary fixing step of the chip type capacitor, the melting step of cream solder and the re-solidification step of the cream solder in the order, the position of the chip type capacitor on the mounting substrate is deviated from the initially set position or the tombstone phenomenon occurs, due to the blowing pressure of water vapor. Although the kind of phenomenon, which is either the positional deviation or the tombstone phenomenon of the chip type solid electrolytic capacitor, and, when the phenomenon is the positional deviation, the direction and magnitude of the deviation may depend upon crack location of the mold resin of the chip type capacitor, timing of the blow-off of water vapor, blowing direction of water vapor and/or blowing speed thereof, it is considered that the deviation or the tombstone phenomenon in the conventional resin encapsulated chip type solid electrolytic capacitor occurs in the mounting step thereof on the mounting substrate for the reason mentioned above.

SUMMARY OF THE INVENTION

An object of the present invention is to provide a construction of a resin encapsulated chip type solid electrolytic capacitor, with which positional deviation or tombstone phenomenon of the resin encapsulated chip type solid electrolytic capacitor during the latter is mounted on a mounting substrate by soldering is prevented.

The chip type solid electrolytic capacitor according to the present invention, which has external anode and cathode terminals for electrically connecting a capacitor element thereof externally of a mold resin encapsulating the capacitor element, is featured by that a water vapor passage, that is, a water vapor discharge passage, is formed in the mold resin. The water vapor discharge passage is formed of a material having higher water vapor permeability than that of the mold resin and functions to communicate an interior of the mold resin to atmosphere.

Since, with such construction of the chip type solid electrolytic capacitor of the present invention, water vapor generated within the mold resin when the chip type capacitor is heated during the latter is mounted on a mounting substrate is discharged externally of the mold resin through the water vapor discharge passage, there is no crack produced due to an increase of the internal pressure of the mold resin member. Therefore, there is no abrupt blow-off of water vapor and it is possible to prevent the positional deviation or the tombstone phenomenon of the chip type capacitor due to blow-off of water vapor in mounting the chip type capacitor on the mounting substrate.

The water vapor discharge passage may be formed by forming a fine porous fluorocarbon resin, which may be derived from tetrafluoroethylene, on and along the anode terminal and/or the cathode terminal. Alternatively, the water vapor discharge passage may be formed by extending the electrically conductive adhesive used in the conventional chip type capacitor of this kind such that the adhesive is exposed on at least one side surface of the mold resin. In the latter case, the manufacturing cost of the chip type capacitor can be restricted since increase in the number of manufacturing steps and in the managing cost of parts is small.

BRIEF DESRIPTION OF THE DRAWINGS

This above-mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

Figure 2:
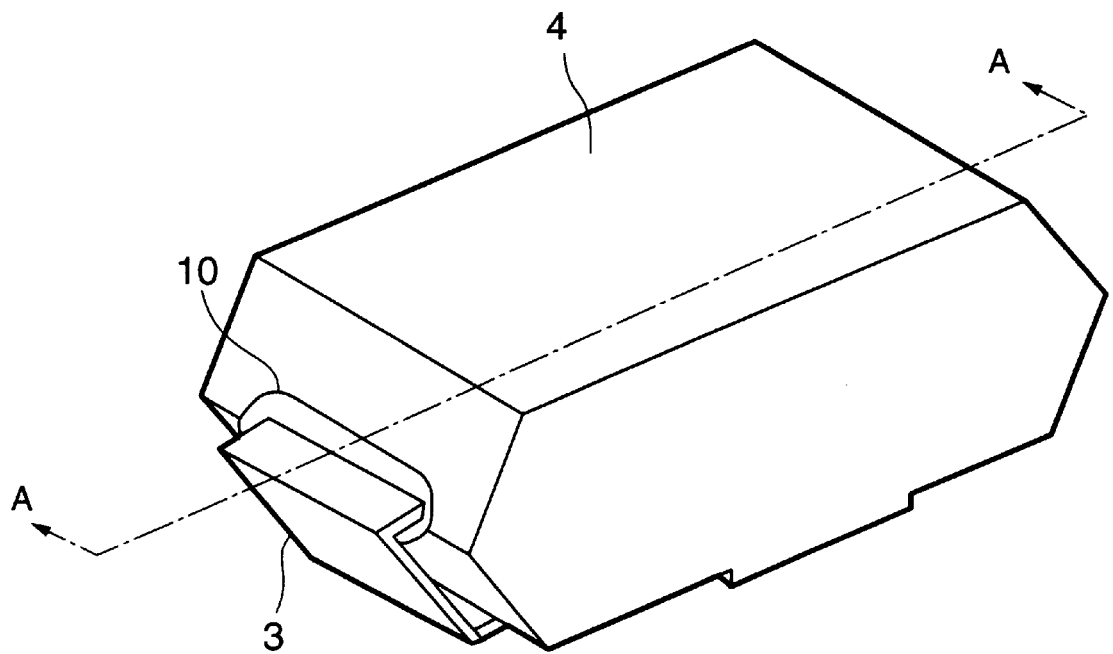
FIG. 2 is a perspective view of a chip type tantalum solid electrolytic capacitor according to the first embodiment of the present invention.

A chip type tantalum solid electrolytic capacitor according to the first embodiment of the present invention will be described with reference to FIG. 2 and FIG. 3. In FIG. 2, the chip type tantalum solid electrolytic capacitor includes a capacitor element 1, a mold resin 4 of such as epoxy resin encapsulating the capacitor element 1 and an anode terminal 2 and a cathode terminal 3 of the capacitor element 1 both in the form of a flat plate electrically connected to a cathode electrode and an anode lead 5 of the capacitor element 1 and horizontally extending therefrom externally of the mold resin 4. The chip type capacitor shown in FIG. 2 and FIG. 3 differs, in structure, from the conventional chip type solid electrolytic capacitor in that a portion of the cathode terminal 3, which is in an interior of the mold resin 4, is covered by a porous fluorocarbon resin 10 of such as polytetrafluoroethylene. Epoxy resin forming the mold resin 4 does not allow water vapor to permeate therethrough. However, since polytetrafluoroethylene has a porous structure, the permeability of polytetrafluoroethylene for water vapor is high compared with the mold resin 4. Therefore, since the porous fluorocarbon resin 10 can function as a water vapor discharge passage for water vapor generated in the mold resin in mounting the chip type capacitor on a mounting substrate by reflow of solder, water vapor is not accumulated within the mold resin 4, so that there is no increase of internal pressure of the mold resin 4, contrary to the conventional chip type solid electrolytic capacitor. Consequently, there is no crack of the mold resin 4 and no abrupt blow-off of water vapor, resulting in that neither the positional deviation of the chip type solid electrolytic capacitor with respect to the mounting substrate nor the tombstone phenomenon occurs.

Figure 1:
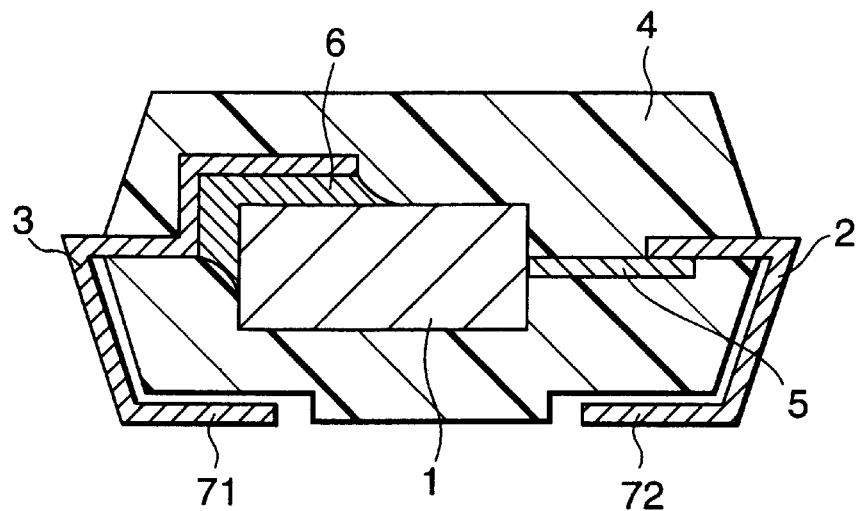
FIG. 1 is a cross section showing an example of a conventional chip type solid electrolytic capacitor.

The porous fluorocarbon resin 10 can be formed by dipping the capacitor element 1 together with the anode terminal 2 and the cathode terminal 3 attached thereto in a mixture of polytetrafluoroethylene and a known solvent and, thereafter, drying it to evaporate the solvent. Alternatively, the porous fluorocarbon resin 10 is formed by painting the cathode terminal 3 with a solution containing polytetrafluoroethylene, by means of a dispenser, and drying it. The chip type tantalum solid electrolytic capacitor according to the present invention differs, in manufacturing method, from the conventional chip type tantalum solid electrolytic capacitor shown in FIG. 1 in that the step of forming the porous fluorocarbon resin 10 is required.

The porous fluorocarbon resin 10 may be formed of other material than polytetrafluoroethylene. For example, tetrafluoroethylene-hexafluoropropylene copolymer, polychlorotrifluoroethylene, perfluoroethylene-perfluoroalkylvinylether copolymer or ethylene-tetrafluoroethylene copolymer, as disclosed in, for example, Japanese Patent Application Laid-open No. H4-280660, may be used.

Figure 3:
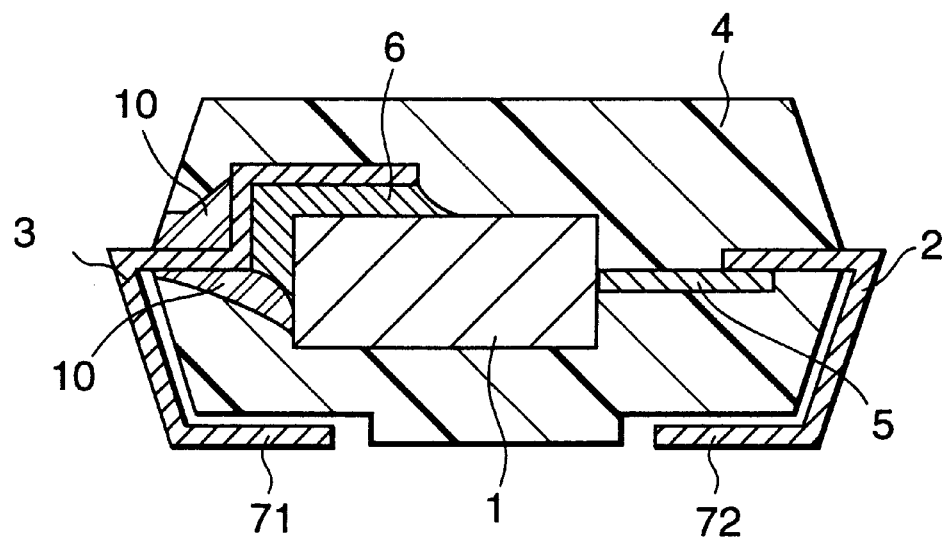
FIG. 3 is a cross section taken along a line A—A in FIG. 2.

In the example shown in FIG. 3, the cathode terminal 3 is covered by the porous fluorocarbon resin 10. However, it is possible to cover the anode terminal 2 with a porous fluorocarbon resin, alternatively. Since the electrically conductive adhesive 6 connecting the cathode electrode of the capacitor element 1 to the cathode terminal 3 also has higher permeability for water vapor than the mold resin 4 as to be described later, it is more effective in discharging water vapor to provide a porous fluorocarbon resin 10 on the side of the cathode terminal 3 closer to the electrically conductive adhesive 6, as shown in FIG. 3.

Figure 4:
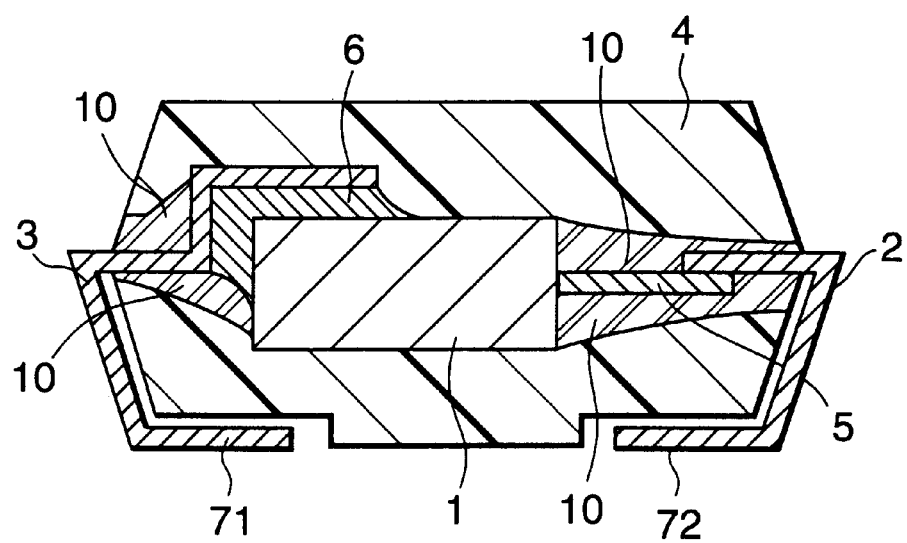
FIG. 4 is a cross section of a chip type tantalum solid electrolytic capacitor according to the second embodiment of the present invention.

The porous fluorocarbon resin 10 may be provided on both the cathode terminal 3 and the anode terminal 2 as shown in FIG. 4, which shows the second embodiment of the present invention. With such structure, it is possible to improve the water vapor discharge performance of the chip type capacitor compared with the case of the first embodiment shown in FIG. 3.

Figure 5:
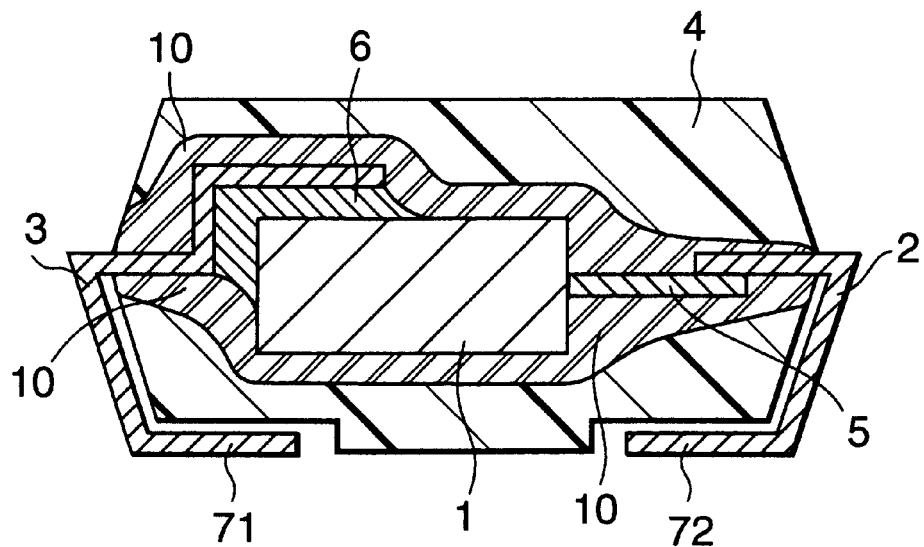
FIG. 5 is a cross section of a chip type tantalum solid electrolytic capacitor according to the third embodiment of the present invention.

Further, as shown in FIG. 5, shows the third embodiment, it may be possible to cover not only the cathode and anode terminals 3 and 2 but also the whole capacitor element 1 with a porous fluorocarbon resin. In such case, it is possible to further improve the water vapor discharge performance. Since the fluorocarbon resin is electrically insulating material, there is no short-circuit occurs between the anode terminal 2 and the cathode terminal 3.

Figure 6:
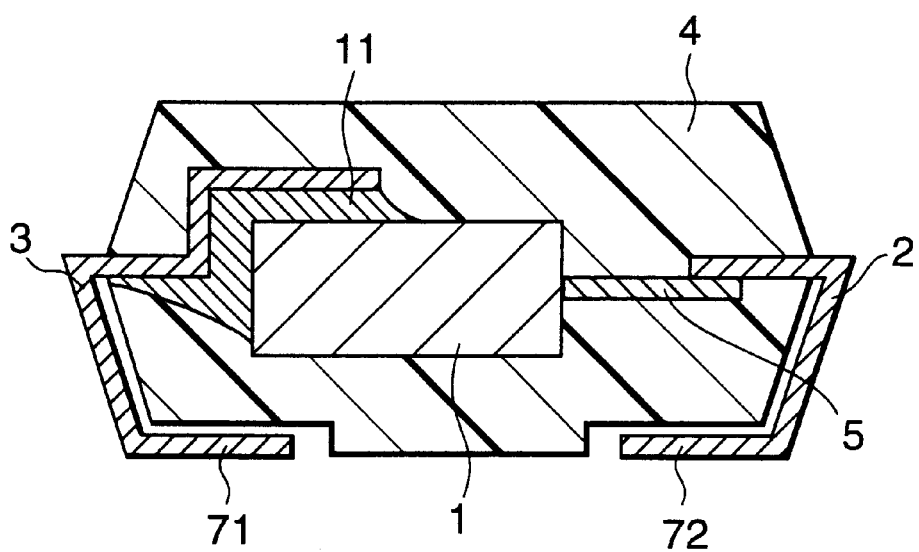
FIG. 6 is a cross section of a chip type tantalum solid electrolytic capacitor according to the fourth embodiment of the present invention.

Now, the fourth embodiment of the present invention will be described with reference to FIG. 6. The fourth embodiment shown in FIG. 6 differs from any of the chip type capacitors shown in FIG. 3 to FIG. 5 in that an electrically conductive adhesive layer 11 connecting the capacitor element 1 to the cathode terminal 3 is exposed on the side surface of the mold resin 4. The electrically conductive adhesive layer 11 can be formed without requiring any special fabrication step dedicated thereto. That is, the electrically conductive adhesive layer 11 can be provided by using an increased amount of electrically conductive adhesive material in adhering the cathode terminal 3 to the capacitor element 1.

The electrically conductive adhesive layer 11 may be of the same electrically conductive adhesive as that used in manufacturing the conventional chip type tantalum solid electrolytic capacitor, which is a mixture of epoxy resin mainly and silver powder for providing the electrical conductivity. However, the water vapor permeability of the electrically conductive adhesive layer is high enough compared with the mold resin 4 of epoxy resin. Although the reason for this is not always clear, it may be considered that silver powder mixed therein contributes to the improvement of the water vapor discharge performance. Comparing with the water vapor permeability of the porous fluorocarbon resin of the first embodiment, the water vapor permeability of the electrically conductive adhesive is as low as a half. However, in this embodiment, since the electrically conductive adhesive layer 11 functions as an adhesive and the water vapor discharge passage during the solder reflow as well, there is neither crack of the mold resin 4 nor abrupt blow-off of water vapor, resulting in that neither the positional deviation of the chip type solid electrolytic capacitor with respect to the mounting substrate nor the tombstone phenomenon occurs.

Similarly to the chip type tantalum solid electrolytic capacitor of according to the first, second or third embodiment, it is possible in this embodiment to form the electrically conductive adhesive layer 11 functioning as the water vapor discharge passage on the side of not the cathode terminal 3 but the anode terminal 2. Furthermore, similarly to the second embodiment shown in FIG. 4, it is possible to form the electrically conductive adhesive layer 11 on both the cathode terminal 3 and the anode terminal 2 and, similarly to the third embodiment shown in FIG. 5, it is possible to cover the cathode and anode terminals and the capacitor element 1 with the electrically conductive adhesive. In any case, the electrically conductive adhesive layer 11 functioning as the water vapor discharge passage does not short-circuit between the anode terminal 2 and the cathode terminal 3.

Unlike the first to third embodiments, the fourth embodiment does not require other parts and materials than those used in the conventional chip type tantalum solid electrolytic capacitor, without requiring any special fabrication step. Therefore, comparing with the first to third embodiments, the increase and/or change of the manufacturing steps or the increase of management cost of parts and materials with respect to the conventional chip type capacitor is small.

In the embodiments described hereinbefore, the porous fluorocarbon resin 10 or the electrically conductive adhesive layer 11, which constitutes the water vapor discharge passage, is not limited to that covering the anode terminal 2, the cathode terminal 3 or the capacitor element 1. The porous fluorocarbon resin or the electrically conductive adhesive may be enough to cover a portion of these external terminals or the capacitor element, provided that it is exposed in at least one side surface of the mold resin 4. Portions to be covered by the fluorocarbon resin or the electrically conductive adhesive are to be determined by taking change of mechanical strength of the mold resin 4 and water vapor discharge performance thereof into consideration. For example, in the embodiment shown in FIG. 2, the porous fluorocarbon resin 10 is provided on both surfaces of the cathode terminal 3. However, the porous fluorocarbon resin may be provided on only one surface of the cathode terminal 3. An area of the water vapor discharge passage 10 exposed on the side surface of the mold resin 4 may be substantially equal to a cross sectional area of the cathode terminal 3.

In the chip type resin encapsulated solid electrolytic capacitor according to the present invention, it may be considered that atmospheric moisture (water vapor) tends to immigrate into the interior of the chip type capacitor through the water vapor discharge passage. However, in the chip type solid electrolytic capacitor, it has been known that influence of moisture on the electric characteristics thereof or the reliability thereof is generally small. Further, the function of the mold resin 4 itself is mainly to give mechanical characteristics for holding the capacitor element and the external terminals, protecting the capacitor element during a handling thereof and/or maintaining electrical insulation with respect to other electronic parts and/or wiring, rather than to improve the water-resistant characteristics thereof. Therefore, there is substantially no adverse effect of the easiness of moisture immigration.

Although the chip type tantalum solid electrolytic capacitor including a tantalum oxide film as the dielectric member has been described. However, the present invention is not limited thereto and is generally applicable to chip type solid electrolytic capacitors in each of which a capacitor element including a metal oxide such as aluminum oxide as a dielectric member and encapsulated in a mold resin.

As described hereinbefore, according to the present invention, the water vapor discharge passage of a material having higher water vapor permeability than that of a water-resistant mold resin encapsulating a capacitor element and external anode and cathode terminals for electric connection of the capacitor element to external elements and communicating an interior of the resin member to atmosphere is formed in the chip type solid electrolytic capacitor.

Therefore, according to the present invention, it is possible to prevent the positional deviation of the chip type capacitor with respect to the mounting substrate or the tombstone phenomenon, which is caused by evaporation of water contained in the capacitor element by heating for solder reflow and abrupt blow-off of water vapor through crack or cracks of the mold resin generated by increased internal pressure of the mold resin to thereby maintain the reliable electrical connection between the chip type capacitor and the mounting substrate.

The water vapor discharge passage can be constructed by using the porous fluorocarbon resin or the electrically conductive adhesive. When the electrically conductive adhesive is used therefor, there is no need of providing a special fabrication step for forming the water vapor discharge passage and requiring no cost for managing parts therefor. Therefore, the present invention is effective in restricting the increase of the fabrication cost.

Although the present invention has been described with reference to specific embodiments, this description is not meant to be construed in a limiting sense. Various modifications of the disclosed embodiments will become apparent to persons skilled in the art upon reference to the description of the invention. It is, therefore, contemplated that the appended claims will cover any modifications of the embodiments as fall within the true scope of the present invention.

What is claimed is:

1. A chip type solid electrolytic capacitor comprising:
   a solid electrolytic capacitor element encapsulated in a mold resin;
   an anode terminal electrically connected to an anode lead of said solid electrolytic capacitor element and led out from said mold resin;
   a cathode terminal electrically connected to a cathode electrode of said solid electrolytic capacitor element and led out from said mold resin; and
   a water vapor discharge passage formed of a water vapor permeable material and extending between an interface between said solid electrolytic capacitor element and said mold resin and an outer surface of said mold resin such that water vapor in said solid electrolytic capacitor element is discharged externally from said mold resin.

2. A chip type solid electrolytic capacitor as claimed in claim 1, wherein said water vapor discharge passage is formed of porous fluorocarbon resin.

3. A chip type solid electrolytic capacitor as claimed in claim 2, wherein said porous fluorocarbon resin extends along at least one of said anode terminal and said cathode terminal, such that said porous fluorocarbon resin covers said at least one of said anode terminal and said cathode terminal, and is exposed on said outer surface of said mold resin.

4. A chip type solid electrolytic capacitor as claimed in claim 2, wherein said porous fluorocarbon resin completely covers said solid electrolytic capacitor element, extends along said anode terminal and said cathode terminal and is exposed on said outer surface of said mold resin.

5. A chip type solid electrolytic capacitor as claimed in claim 1, wherein said water vapor permeable material is provided continuously between said solid electrolytic capacitor element and said mold resin and between said cathode terminal and said mold resin.

6. A chip type solid electrolytic capacitor as claimed in claim 1, wherein said cathode terminal is connected to said solid electrolytic capacitor element through an electrically conductive adhesive and said water vapor permeable material is provided, such that said water vapor permeable material is continuously in contact with said solid electrolytic capacitor element, said electrically conductive adhesive and said cathode terminal, and exposed on said mold resin.

7. A chip type solid electrolytic capacitor as claimed in claim 6, wherein said water vapor permeable material is the same as a material of said electrically conductive adhesive.

8. A chip type solid electrolytic capacitor as claimed in claim 6, wherein said water vapor permeable material is porous fluorocarbon resin, completely covers said cathode terminal in a region of said mold resin, from which said cathode terminal is led out from said mold resin, and is exposed on said outer surface of said mold resin.

9. A chip type solid electrolytic capacitor as claimed in claim 8, wherein said porous fluorocarbon resin further completely covers a region defined from surface of said solid electrolytic capacitor element, in which said anode lead is implanted, to said region of said mold resin, from which said anode terminal is led out from said mold resin, and is exposed on said outer surface of said mold resin.

10. A chip type solid electrolytic capacitor as claimed in claim 9, wherein said porous fluorocarbon resin further covers a surface of said cathode terminal opposite to a surface thereof adhered to said electrically conductive adhesive.

11. A chip type solid electrolytic capacitor as claimed in claim 7, wherein said electrically conductive adhesive is formed on epoxy resin and silver powder mixed therein.

12. A chip type solid electrolytic capacitor as claimed in claim 2, wherein said porous fluorocarbon resin is a material selected from a group consisting of polytetrafluoroethylene, tetrafluoroethylene-hexafluoropropylene copolymer, polychlorotrifluoroethylene, perfluoroethylene-perfluoroalkylvinylether copolymer and ethylene-tetrafluoroethylene copolymer.

\* \* \* \* \*